United States Patent
Asaoka et al.

(10) Patent No.: US 9,808,976 B2
(45) Date of Patent: Nov. 7, 2017

(54) INJECTION MEMBER ATTACHMENT STRUCTURE FOR INJECTION MOLDING MACHINE

(71) Applicant: FANUC Corporation, Yamanashi (JP)

(72) Inventors: Hiroyasu Asaoka, Yamanashi (JP); Satoshi Yano, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 59 days.

(21) Appl. No.: 14/927,468

(22) Filed: Oct. 30, 2015

(65) Prior Publication Data

US 2016/0129617 A1 May 12, 2016

(30) Foreign Application Priority Data

Nov. 6, 2014 (JP) .................. 2014-226327

(51) Int. Cl.
*B29C 45/50* (2006.01)
*B29C 45/17* (2006.01)

(52) U.S. Cl.
CPC .......... *B29C 45/50* (2013.01); *B29C 45/1775* (2013.01)

(58) Field of Classification Search
CPC ........................... B29C 45/1775; B29C 45/50
See application file for complete search history.

(56) References Cited

U.S. PATENT DOCUMENTS 2,965,929 A * 12/1960 Smith .................. B29C 45/1775
425/166

2010/0062095 A1 * 3/2010 Cadonau ............. B29C 45/1775
425/170
2014/0116608 A1   5/2014 Sato et al.

FOREIGN PATENT DOCUMENTS

| CN | 201162782 Y | 12/2008 |
| CN | 101594972 A | 12/2009 |
| CN | 103790985 A | 5/2014 |
| CN | 203580052 U | 5/2014 |
| DE | 3229223 A1 | 4/1983 |
| DE | 102006061356 A1 | 7/2008 |
| JP | 62-77917 | * 4/1987 |
| JP | 64-82912 | * 3/1989 |
| JP | 3-23420 U | 3/1991 |
| JP | 10-100217 A | 4/1998 |
| JP | 2003-39503 A | 2/2003 |
| JP | 2003-211490 A | 7/2003 |
| JP | 2010-58275 A | 3/2010 |

OTHER PUBLICATIONS

Office Action in CN Application No. 201510745155.2, dated Mar. 21, 2017.
Office Action in DE Application No. 102015014010.8, dated Mar. 7, 2017.
Office Action in CN Application No. 201510745155.2, dated Jul. 17, 2017.

* cited by examiner

*Primary Examiner* — Jill Heitbrink
(74) *Attorney, Agent, or Firm* — Hauptman Ham, LLP

(57) ABSTRACT

When an injection member such as a screw injecting a molten material into a mold is attached to an injection molding machine, a buffer spacer is provided between the injection member and a power transmission member such as an injection shaft sleeve transmitting forward/backward moving power to the injection member. Then, the buffer spacer is fixed to the power transmission member by a bolt.

6 Claims, 4 Drawing Sheets

INJECTION MEMBER ATTACHMENT STRUCTURE FOR INJECTION MOLDING MACHINE

RELATED APPLICATIONS

The present application claims priority to Japanese Application Number 2014-226327, filed Nov. 6, 2014, the disclosure of which is hereby incorporated by reference herein in its entirety.

BACKGROUND OF THE INVENTION

1. Field of the Invention

The present invention relates to an injection member attachment structure for an injection molding machine.

2. Description of the Related Art

In a general in-line type injection molding machine, a screw having a spiral groove is disposed inside a heating cylinder so as to be used as a member that feeds resin into a mold, a pellet-shaped resin material is fed into the heating cylinder, the resin material is melted and measured by the rotation and the backward movement of the screw, and the molten resin is injected into the mold by the forward movement of the screw so as to perform a molding process.

For that reason, the screw is attached to the injection molding machine so as to transmit the rotational power and the forward/backward moving power. Due to the rotation and the forward/backward movement of the screw, the rotational power is transmitted to the screw by a key groove or a spline. Due to the forward/backward movement of the screw, the power is mainly transmitted in the screw retracting direction by the key groove or the flange. Further, the power is transmitted in the screw advancing direction when the rear end surface of the screw is pressed by an injection shaft during the injection.

In a recent molding machine, parts are decreased in thickness, and a high injection pressure is demanded during a molding process. Accordingly, an injection operation is performed at a high injection force. However, when the injection force of the injection operation is increased, the rear end surface of the screw is pressed by a large force during the injection operation. Accordingly, a large load is applied to the rear end surface of the screw and a pressing surface of the injection shaft pressing the screw.

When such a large load is repeatedly applied to the screw due to the injection operation, there is concern that plastic deformation will occur in the rear end surface of the screw or sink tracing will occur in the pressing surface of the injection shaft. The plastic deformation or the sink tracing is called permanent strain. When the permanent strain occurs, rattling which is not expected in design occurs. Thus, there is concern that the molding controllability is degraded or the part is damaged. For that reason, it is desirable to decrease the load applied to the rear end surface of the screw as small as possible during the injection operation.

As a technique of decreasing the load applied to the rear end surface of the screw or the pressing surface of the injection shaft, there is known a technique of increasing a contact area between the rear end surface of the screw and the pressing surface of the injection shaft by increasing the size of the rear end surface of the screw. However, when the outer diameter of the rear end surface of the screw is set to be larger than the inner diameter of the heating cylinder of the molding machine, the screw is extracted from the inside of the heating cylinder during the maintenance only in the backward direction since the maintenance is performed by separating the screw from the injection molding machine, and hence the maintenance workability is degraded.

In order to prevent degradation in maintenance workability, the outer diameter of the rear end surface of the screw needs to be equal to or smaller than the inner diameter of the heating cylinder. Thus, there is a physical limit in the technique of increasing the contact area between the rear end surface of the screw and the pressing surface of the injection shaft.

Another technique of preventing the permanent strain in the rear end surface of the screw or the pressing surface of the injection shaft is disclosed, for example, in the following three patent documents.

JP 2010-58275 A discloses a technique of increasing the diameter of a pressure receiving surface pressed in a screw of an injection molding machine and providing a spacer between the pressure receiving surface of a rear end of a screw and a spline.

JP 2003-211490 A discloses a technique of providing a spacer between a rear end surface of a screw and a sleeve.

JP 3-23420 Y discloses a technique of providing an intermediate member between a rear end surface of a screw and an injection shim.

However, in the techniques disclosed in the above-described three patent documents, the spacer or the intermediate member is provided, but a member for fixing the spacer or the intermediate member is not disclosed.

For that reason, in the related art, when the permanent strain occurs in the spacer or the intermediate member, the rattling of the spacer or the intermediate member or the uneven contact thereof occurs so that the permanent strain or the breakage of the spacer or the intermediate member is promoted or seizure inside the injection shaft sleeve occurs. Accordingly, there is concern that the spacer or the intermediate member may not be detached from the injection shaft sleeve.

Further, there is concern that the spacer or the intermediate member will come off from the injection shaft sleeve when the screw is detached for the maintenance and hence an operator or a peripheral object is be damaged.

SUMMARY OF THE INVENTION

Here, an object of the invention is to provide an injection member attachment structure for an injection molding machine capable of reliably replacing a buffer spacer without causing any damage in the buffer spacer even when permanent strain occurs in the buffer spacer during a molding process at a high injection pressure.

According to an aspect of the invention, provided is an injection member attachment structure for an injection molding machine used to attach an injection member, moving forward and backward so as to inject a molten material into a mold, to an injection molding machine, including: a power transmission member transmitting forward/backward moving power to the injection member; a buffer spacer provided between a rear end surface of the injection member in the injection axis direction and an end surface of the power transmission member facing the injection member; and a regulation member regulating the movement of the buffer spacer in the injection axis direction of the injection member.

In the injection member attachment structure according to the invention, since the regulation member is provided so as to regulate the movement of the buffer spacer in the injection axis direction of the injection member, the buffer spacer does not move even when a gap is formed between the screw and the buffer spacer due to the permanent strain in the buffer spacer. For this reason, there is no case where a partial contact occurs in the rear end surface of the screw due to the rattling of the buffer spacer. Accordingly, it is possible to prevent a problem in which the buffer spacer is damaged or deformed unexpectedly or the buffer spacer is not detached from the power transmission member. Further, since the movement of the buffer spacer is regulated by the regulation member, the buffer spacer does not come off when the screw is detached for the maintenance. Accordingly, it is possible to prevent a problem caused when the screw is assembled without being aware of falling off of the buffer spacer during the maintenance.

The buffer spacer may have a substantially line-symmetrical shape with respect to the center axis thereof.

In the embodiment, since the buffer spacer has a substantially line-symmetrical shape with respect to a predetermined axis, a first surface can be switched to a second surface opposite to the first surface. Thus, when permanent strain occurs first, the surface (the first surface) of the buffer spacer can be switched to the other surface (the second surface) and the buffer spacer can be replaced by new one when permanent strain occurs in both first and second surfaces. Accordingly, the number of times of replacing the buffer spacer can be decreased, and hence the maintenance cost can be decreased.

A surface contacting the injection member in the buffer spacer may have hardness different from the other portions.

In the embodiment, since a surface contacting the injection member in the buffer spacer has hardness different from the other portion, it is possible to prevent a partial contact caused between a strong contact portion and a weak contact portion within a surface even when permanent strain occurs in a part of the surface contacting the injection member. Further, when the entire hardness of the buffer spacer is increased, there is concern that the buffer spacer may be broken particularly when the thickness of the buffer spacer is decreased. However, since the hardness of the surface contacting the injection member is set to be different from those of the other portions, it is possible to prevent the breakage of the buffer spacer.

The position of a surface contacting the injection member in the buffer spacer in the injection axis direction may be adjusted in the injection axis direction.

In the embodiment, since the position of the surface contacting the injection member in the buffer spacer is adjustable in the injection axis direction, the position of the contact surface can be adjusted so as to match the position of the initially set pressing surface, and hence the attachment of the injection member can be easily adjusted.

The buffer spacer may be composed of a plurality of members.

In the embodiment, since the buffer spacer includes the plurality of members, the buffer spacer can be partially replaced even when permanent strain occurs in the buffer spacer without essentially replacing the entire buffer spacer, and hence an increase in maintenance cost can be suppressed.

A member that composes the buffer spacer may include an elastically deformable structure.

In the embodiment, since the member constituting the buffer spacer includes the elastically deformable structure, the pressing surface of the buffer spacer with respect to the injection member can be moved while the elastic body is lengthened and shortened even when permanent strain occurs in the buffer spacer, and hence the contact state between the buffer spacer and the injection member can be maintained.

Since the invention has the above-described configuration, it is possible to provide an injection member attachment structure for an injection molding machine capable of reliably replacing a buffer spacer without causing any damage in the buffer spacer even when permanent strain occurs in the buffer spacer during a molding process at a high injection pressure.

BRIEF DESCRIPTION OF THE DRAWINGS

The forgoing and other objects and feature of the invention will be apparent from the following description of preferred embodiments of the invention with reference to the accompanying drawings, in which.

DETAILED DESCRIPTION OF THE PREFERRED EMBODIMENTS

First, an injection member attachment structure of a first embodiment of the invention will be described with reference to FIGS. 1 and 2.

Figure 1:
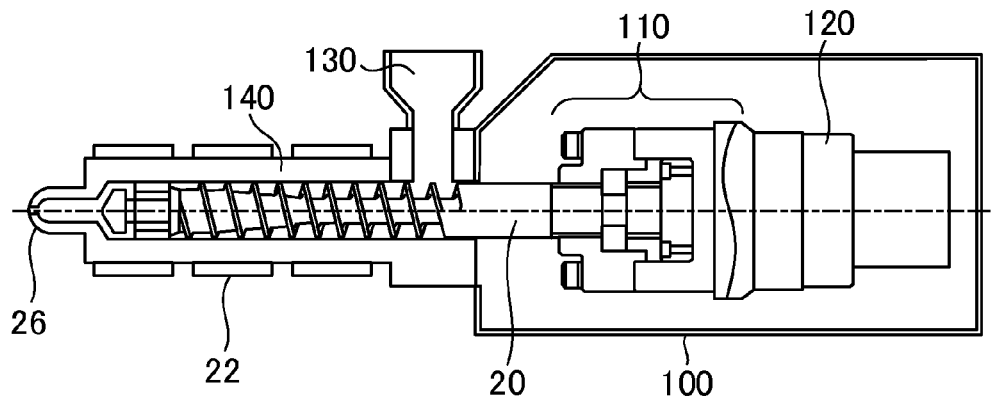
FIG. 1 is a cross-sectional view of an injection unit of an injection molding machine with an injection unit attachment structure of a first embodiment of the invention.

As illustrated in FIG. 1, an injection unit 100 of an injection molding machine includes a heating cylinder 140, a screw 20 inserted into the heating cylinder 140, a driving device 120 driving the screw 20, a screw attachment portion 110 connecting the driving device 120 and the screw 20, a hopper 130 storing a resin material and supplying the resin material into the heating cylinder 140, and a plurality of heaters 22 provided outside the heating cylinder 140. These heaters 22 heat the heating cylinder 140 and the screw 20 so as to melt the resin material supplied from the hopper 130 inside the heating cylinder 140. The screw 20 is used to inject the molten resin material into a mold (not illustrated) through a nozzle 26.

Figure 2:
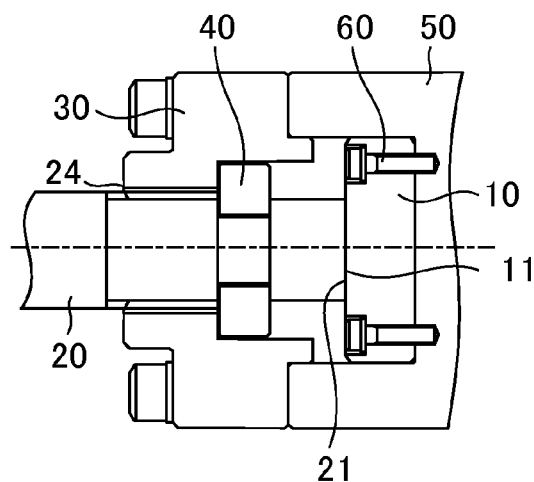
FIG. 2 is an enlarged view of a screw attachment portion of the injection unit of FIG. 1.

As illustrated in FIG. 2, the screw attachment portion 110 includes a spline 24 provided at the outer periphery of the screw 20, a retainer 40 stuck to the middle portion of the screw 20, an injection shaft sleeve 50, and a bush 30. When the injection shaft including the screw 20 is held by the bush 30 and the retainer 40, power generated from the driving device 120 is transmitted to the screw 20.

As illustrated in FIG. 2, a buffer spacer 10 is provided between the injection shaft sleeve 50 and the screw 20. If a structure is provided in which the injection shaft sleeve 50 and the screw 20 directly contact each other (without the buffer spacer 10 interposed therebetween), there is concern that permanent strain will occur in the contact surface of the injection shaft sleeve 50 with respect to the screw 20. However, the permanent strain of the injection shaft sleeve 50 is prevented by interposing the buffer spacer 10 between the injection shaft sleeve 50 and the screw 20 as illustrated in FIG. 2. The buffer spacer 10 and the screw 20 press each other while a screw pressing surface 11 of the buffer spacer 10 and a rear end surface 21 of the screw 20 contact each other. Here, it is desirable to adjust the thickness of the buffer spacer 10 so that the forward/backward moving play of the screw 20 does not exist with respect to the attachment portion of the screw 20 in the initial state. However, it is possible to move the screw forward and backward without any influence even when a slight gap (play) exists between the buffer spacer 10 and the screw 20.

Further, a bolt 60 penetrates the buffer spacer 10 so that a screw portion of the front end thereof is implanted into the injection shaft sleeve 50. The bolt 60 serves as a regulation member that regulates the movement of the buffer spacer 10 in the injection axis direction of the screw 20.

The buffer spacer 10 is formed so that the diameter is larger than the diameter of the screw 20, and the buffer spacer 10 is fixed to the injection shaft sleeve 50 by two bolts 60 penetrating the outer peripheral portion thereof (that is, an area not facing the rear end surface 21 of the screw 20). These two bolts 60 are provided at the symmetrical positions in the outer peripheral portion of the buffer spacer 10 with the center axis interposed therebetween. However, the number of the bolts 60 is not limited to two, but the buffer spacer 10 may be fixed by using more bolts 60 or the buffer spacer 10 may be fixed by using only one bolt 60 provided in the center portion of the buffer spacer 10. Further, the buffer spacer 10 can be fixed by using the bolt 60 extending in a direction orthogonal to the injection direction (the center axis direction of the screw 20) instead of the bolt 60 extending in the injection direction.

Further, the injection member according to the embodiment is the screw 20 in the case of the injection molding machine of FIGS. 1 and 2, but is a plunger in a plunger type injection molding machine. Alternatively, the injection member of the invention can be a member that allows to inject molten resin into a mold of an injection molding machine, in addition to the screw or the plunger.

Here, if a molding process is performed at a high injection pressure when the buffer spacer 10 provided between the screw 20 and the injection shaft sleeve 50 is not fixed by the bolt, there is concern that permanent strain (sink tracing) will occur in the contact surface of the buffer spacer 10 with respect to the other members. Then, if the buffer spacer 10 is not fixed when such permanent strain occurs, a partial contact occurs due to the rattling of the buffer spacer 10. Thus, there is concern that the permanent strain or the breakage of the buffer spacer 10 will be promoted or the buffer spacer 10 is not detached from the injection shaft sleeve due to the seizure inside the injection shaft sleeve.

Regarding the attachment of the buffer spacer 10, when the buffer spacer 10 is only interposed between the injection shaft sleeve 50 and the screw 20, there is concern that the buffer spacer 10 will come off from the injection shaft sleeve 50 during the detachment of the screw 20 for maintenance.

Incidentally, in the embodiment, since the buffer spacer 10 is fixed to the injection shaft sleeve 50 by the bolt 60 so as to regulate the movement of the screw 20 in the injection axis direction, the rattling or the uneven contact of the buffer spacer 10 is suppressed in the event of the permanent strain of the buffer spacer 10. Accordingly, it is possible to suppress a concern that the buffer spacer 10 is not detached from the injection shaft sleeve 50 without any damage or deformation in the buffer spacer 10 other than the above-described expected situation.

Further, in the embodiment, since the buffer spacer 10 cannot be detached from the injection shaft sleeve 50 unless the bolt 60 is detached, the buffer spacer 10 is not unexpectedly detached from the injection molding machine (the injection shaft sleeve 50) when the screw 20 is detached for maintenance. For that reason, it is possible to prevent a problem caused when the screw 20 is assembled without being aware of falling off of the buffer spacer 10 during the maintenance.

Further, even when permanent strain occurs in the buffer spacer 10, the maintenance can be performed at low cost, since the buffer spacer 10 is cheaper than the screw 20 or the injection shaft sleeve 50 and is easily replaced.

Next, an injection member attachment structure of a second embodiment of the invention will be described with reference to FIG. 3.

Figure 3:
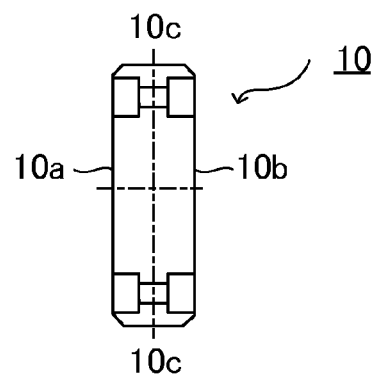
FIG. 3 is a diagram illustrating a buffer spacer constituting an injection unit attachment structure of a second embodiment of the invention.

As illustrated in FIG. 3, the buffer spacer 10 constituting the injection member attachment structure according to the embodiment is formed in a line-symmetrical shape with respect to the center axis 10c. Further, the configuration other than the buffer spacer 10 is the same as that of the first embodiment (see FIGS. 1 and 2).

First, the buffer spacer 10 is attached so that a first surface 10a contacts (the rear end surface 21 of) the screw 20. Then, when permanent strain occurs in the buffer spacer 10, the first surface 10a of the buffer spacer and s second surface 10b opposite to the first surface 10a are switched, and the buffer spacer is attached so that the second surface 10b of the buffer spacer 10 contacts (the rear end surface 21 of) the screw 20. When permanent strain occurs in the second surface 10b as well as the first surface 10a, the buffer spacer 10 is replaced by new one. For this reason, since one buffer spacer 10 can be used for a cases in which the first surface 10a contacts the screw 20 and another case in which the second surface 10b contacts the screw 20, the maintenance cost of the buffer spacer 10 can be decreased.

Next, an injection member attachment structure of a third embodiment of the invention will be described with reference to FIGS. 4 and 5.

When the screw attachment portion 110 of the injection molding machine decreases in size, there is also a case where the thickness of the insertable buffer spacer 10 is limited. Here, there is a need to improve the hardness of the buffer spacer 10 to a certain degree in order to decrease the permanent strain of the buffer spacer 10. However, if the entire hardness of the buffer spacer 10 is increased when the thickness of the buffer spacer 10 is thin, there is concern that the buffer spacer 10 may be broken. Further, when permanent strain occurs in a part of the contact surface of the buffer spacer 10 with respect to the screw 20, a strong contact portion and a weak contact portion occur within the surface, and hence permanent strain is further promoted due to a partial contact.

Figure 5:
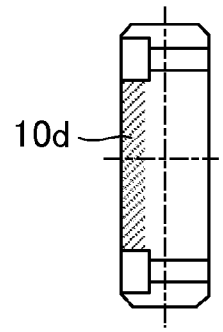
FIG. 5 is a diagram illustrating a buffer spacer constituting the injection unit attachment structure illustrated in FIG. 4.

Here, in the embodiment, as indicated by the hatching of FIG. 5, the buffer spacer 10 is formed so that only the hardness of a center portion 10d contacting the screw 20 is high (here, the hardness is equal to that of the rear end including the rear end surface 21 of the screw 20).

In the embodiment, since the entire hardness of the buffer spacer 10 is not high (that is, the hardness of only a part of the buffer spacer 10 is high), the concern for the breakage of the buffer spacer 10 decreases. Further, permanent strain can selectively be caused to occur at a position where the hardness of the buffer spacer 10 is low through the control of a region where the hardness of the buffer spacer 10 is to be increased. Accordingly, the contact surface between the buffer spacer 10 and the rear end of the screw 20 can be maintained at the same state all the time, and hence the uneven contact of the buffer spacer 10 caused by the permanent strain can be suppressed.

Next, an injection member attachment structure of a fourth embodiment of the invention will be described.

Figure 4:
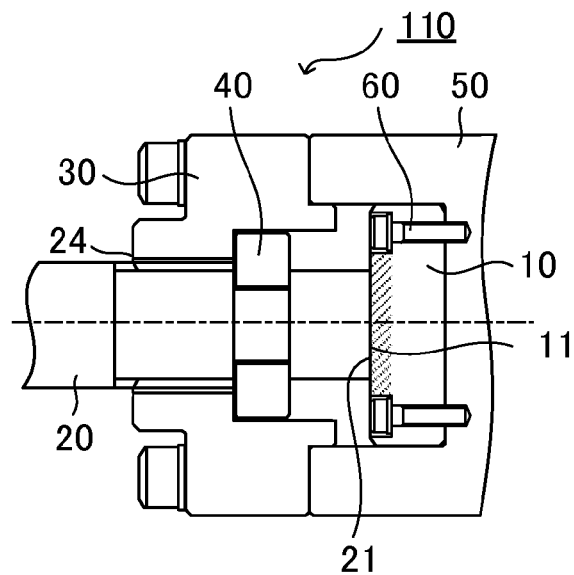
FIG. 4 is a cross-sectional view of an injection unit of an injection molding machine with an injection unit attachment structure of a third embodiment of the invention.

In the embodiment, only the hardness of the center portion 10d of the buffer spacer 10 is set to be low differently from the third embodiment (FIGS. 4 and 5). Accordingly, since only the center portion of the buffer spacer 10 contacting the screw 20 sinks uniformly, the uniform contact with respect to the screw 20 can be attained.

Next, an injection member attachment structure of a fifth embodiment of the invention will be described with reference to FIG. 6.

Generally, a recent injection molding machine requires a high injection pressure in accordance with a decrease in thickness of a product. However, the injection speed or the acceleration is large and the injection time is shortened in accordance with a decrease in thickness of a product. As a result, when a gap exists between the screw 20 and the buffer spacer 10, the idle running distance increases until the screw 20 is pressed after the movement of the injection shaft sleeve during injection, and hence there is concern for degradation in controllability. Further, the impact generated by the contact between the screw 20 and the buffer spacer 10 due to the idle running increases, and hence the risk in the deformation or the damage of the buffer spacer 10 increases.

For that reason, it is desirable that no gap exist between the screw 20 and the buffer spacer 10. However, the maintenance cost would increase in case where the buffer spacer 10 is replaced whenever a permanent strain occurs.

Figure 6:
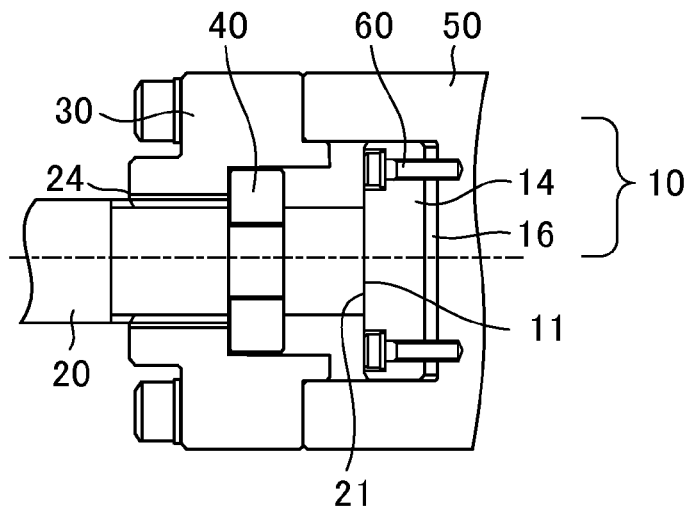
FIG. 6 is a cross-sectional view of an injection unit of an injection molding machine with an injection unit attachment structure of a fifth embodiment of the invention.

Here, as illustrated in FIG. 6, the buffer spacer 10 constituting the injection member attachment structure according to the embodiment includes a buffer spacer body 14 and a shim-shaped adjustment spacer 16. The buffer spacer body 14 is fixed to the injection shaft sleeve 50 by the bolt 60. The adjustment spacer 16 is provided so as to adjust a gap between the buffer spacer 10 (the buffer spacer body 14) and the screw 20.

In the embodiment, even when permanent strain occurs in the buffer spacer 10 (the buffer spacer body 14), it is possible to remove a gap between the screw 20 and the buffer spacer 10 by changing the thickness of the adjustment spacer 16 or the number of the adjustment spacers 16 in accordance with the permanent strain amount. Since the buffer spacer body 14 may be replaced at a time point in which the permanent strain occurs in the buffer spacer 10 (the buffer spacer body 14) by a certain degree and the entire buffer spacer 10 does not need to be replaced every time, the maintenance cost can be decreased.

Next, an injection member attachment structure of a sixth embodiment of the invention will be described with reference to FIGS. 7 and 8.

Figure 7:
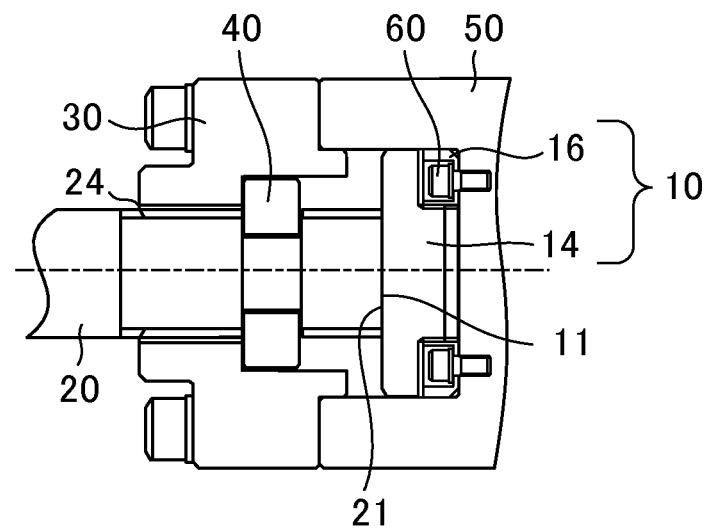
FIG. 7 is a cross-sectional view of an injection unit of an injection molding machine with an injection unit attachment structure of a sixth embodiment of the invention.

As illustrated in FIG. 7, the buffer spacer 10 constituting the injection member attachment structure according to the embodiment includes the buffer spacer body 14 and the shim-shaped adjustment spacer 16. The adjustment spacer 16 is fixed to the injection shaft sleeve 50 by the bolt 60. Further, the buffer spacer body 14 and the adjustment spacer 16 are coupled to each other by a screw portion (not illustrated).

Figure 8:
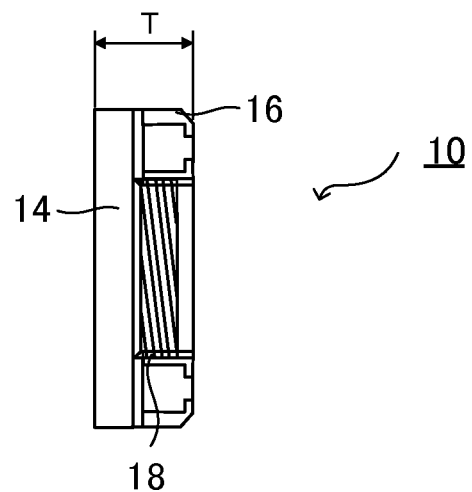
FIG. 8 is a diagram illustrating a buffer spacer constituting the injection unit attachment structure of FIG. 7.

As illustrated in FIG. 8, the adjustment spacer 16 is provided with an adjustment spacer screw portion 18, and the adjustment spacer 16 engages with the injection shaft sleeve 50 by the adjustment spacer screw portion 18. Since the adjustment spacer 16 engages with the injection shaft sleeve 50 by the adjustment spacer screw portion 18, the insertion amount to the injection shaft sleeve 50 can be adjusted.

Accordingly, since the insertion amount of the buffer spacer body 14 coupled to the adjustment spacer 16 by a screw portion (not illustrated) is adjusted, the thickness T of the buffer spacer 10 can be adjusted, and hence a gap between the screw 20 and the buffer spacer 10 can be removed. For that reason, even when permanent strain occurs in the buffer spacer 10 (the buffer spacer body 14), the position of the pressing surface of the buffer spacer 10 can be adjusted by changing the thickness of the buffer spacer 10 or adjusting the insertion amount of the buffer spacer body 14 or the adjustment spacer 16 in accordance with the permanent strain amount.

Further, since the buffer spacer 10 may be replaced at a time point in which permanent strain occurs in the buffer spacer body 14 by a certain degree, the maintenance cost can be suppressed.

Incidentally, in the fifth embodiment (FIG. 6) and the sixth embodiment (FIG. 7), the buffer spacer 10 is composed of two members. However, even in a case where the buffer spacer 10 is composed of three or more members, these constituting members are coupled to each other in advance by appropriate means such as a screw and at least one of the constituting members is fixed to the injection shaft sleeve 50 by, for example, a regulation member such as the bolt 60. Accordingly, it is possible to obtain a structure in which the buffer spacer 10 including three or more constituting members is not detached from the injection shaft sleeve 50.

Next, an injection member attachment structure of a seventh embodiment of the invention will be described with reference to FIGS. 9 and 10.

Figure 9:
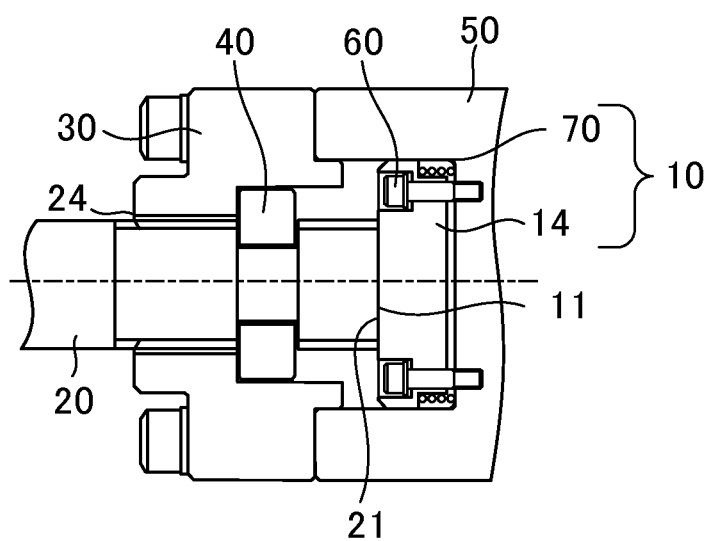
FIG. 9 is a cross-sectional view of an injection unit of an injection molding machine with an injection unit attachment structure of a seventh embodiment of the invention.

As illustrated in FIG. 9, the buffer spacer 10 constituting the injection member attachment structure according to the embodiment includes the buffer spacer body 14 and a coil spring 70.

Further, the buffer spacer body 14 is attached to the injection shaft sleeve 50 by the bolt 60 so as not to be detached from the injection shaft sleeve 50. Further, the buffer spacer body 14 is movable by a predetermined amount in the forward/backward moving direction of the axis of the screw 20. Then, in the attachment state of the screw 20, the position of the buffer spacer body 14 in the forward/backward direction is adjusted so that the screw pressing surface 11 of the buffer spacer body 14 contacts the rear end surface 21 of the screw 20 and the coil spring 70 is shortened by a predetermined amount.

Figure 10:
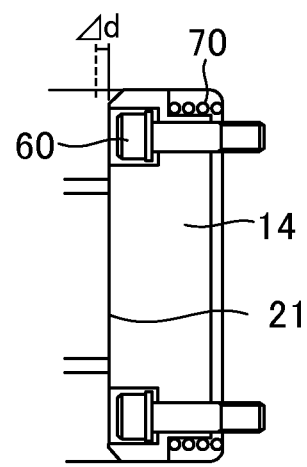
FIG. 10 is an enlarged view of a screw attachment portion of the injection unit of FIG. 9.

Here, as illustrated in FIG. 10, when permanent strain occurs in the buffer spacer body 14 by Δd, the entire length of the coil spring 70 is lengthened by the permanent strain Δd, so that the screw pressing surface 11 of the buffer spacer body 14 moves (advances) by Δd. Accordingly, it is possible to maintain the contact state between the rear end surface 21 of the screw 20 and the screw pressing surface 11 of the buffer spacer body 14.

In the embodiment, since the buffer spacer body 14 may be replaced when the permanent strain occurring in the buffer spacer body 14 exceeds the movable amount of the screw pressing surface 11 of the buffer spacer body 14, the maintenance cost can be suppressed.

Further, in the embodiment, the coil spring 70 is used as an elastic body. However, for example, a flat spring or a disk spring may be used other than the coil spring as long as the entire length of the member is changed by the elastic deformation. Further, the elastic body may be appropriately selected in response to the screw attachment shape or the screw application load.

Further, in the above-described embodiments, the bolt 60 is mainly used as a member that regulates the movement of the buffer spacer 10 in the screw axis direction, and the buffer spacer 10 is fixed so as not to be detached from the injection shaft sleeve 50. However, the regulation member is not limited to the bolt 60, and may be fixed so as not to be detached from the injection shaft sleeve 50 by the use of a pin or a key. Further, in order to fix the regulation member, the regulation member may be inserted not only from the forward/backward moving direction of the screw 20, but also from a direction orthogonal to the screw forward/backward moving direction or an inclined direction as long as the buffer spacer 10 is not detached from the injection shaft sleeve 50. Further, the first embodiment to the seventh embodiment may be used in combination in accordance with the shape of the injection molding machine.

Further, in the description of the embodiment, it is desirable that no gap exist between the screw 20 and the buffer spacer 10 in the initial state in order to prevent the permanent strain. However, in a general injection molding machine, the screw attachment portion 110 is composed of a plurality of parts. For this reason, when a variation in dimension of the individual part in manufacture is taken into consideration, it is difficult to manufacture the injection molding machine without any gap between the screw 20 and the buffer spacer 10 unless the adjustment of the parts is conducted.

In the fifth embodiment to the seventh embodiment, since the position of the screw pressing surface 11 of the buffer spacer 10 can be adjusted, the position of the pressing surface may be adjusted in accordance with the initial dimension. Due to this benefit, it is possible to mention that the structure of the invention is superior to the structure using the buffer spacer of the related art.

The invention claimed is:

1. An injection member attachment structure for attaching an injection member, which is movable forward and backward so as to inject a molten material into a mold, to an injection molding machine, said injection member attachment structure comprising:
   a power transmission member configured to transmit forward/backward moving power to the injection member;
   a buffer spacer provided, in an injection axis direction of the injection member, between a rear end surface of the injection member and an end surface of the power transmission member facing toward the injection member; and
   a regulation member configured to regulate a movement of the buffer spacer in the injection axis direction of the injection member,
   wherein
   the buffer spacer has a surface directly contacting the injection member and having hardness greater than other portions of the buffer spacer.

2. The injection member attachment structure according to claim 1,
   wherein the buffer spacer has a substantially line-symmetrical shape with respect to a center axis of the buffer space, and the center axis of the buffer space is substantially perpendicular to the injection axis direction of the injection member.

3. The injection member attachment structure according to claim 1,
   wherein a position of the surface of the buffer spacer in the injection axis direction is adjustable in the injection axis direction.

4. The injection member attachment structure according to claim 1,
   wherein the buffer spacer has a plurality of members.

5. The injection member attachment structure according to claim 4,
   wherein one of the plurality of members of the buffer spacer includes an elastically deformable structure.

6. An injection member attachment structure for an injection molding machine used to attach an injection member, moving forward and backward so as to inject a molten material into a mold, to an injection molding machine, said injection member attachment structure comprising:
   a power transmission member transmitting forward/backward moving power to the injection member;
   a buffer spacer provided between a rear end surface of the injection member in an injection axis direction and an end surface of the power transmission member facing the injection member; and
   a regulation member regulating a movement of the buffer spacer in the injection axis direction of the injection member,
   wherein
   a surface contacting the injection member in the buffer spacer has hardness different from the other portions,
   the buffer spacer is composed of a plurality of members,
   one of the plurality of members that composes the buffer spacer includes an elastically deformable structure, and
   the injection member is a screw injecting the molten material.

\* \* \* \* \*